United States Patent
Jiang et al.

(10) Patent No.: US 12,498,249 B2
(45) Date of Patent: Dec. 16, 2025

(54) SELF ADAPTIVE ENHANCEMENT FOR AUTOMATED DRIVING WITH MAP AND CAMERA ISSUES

(71) Applicant: GM Global Technology Operations LLC, Detroit, MI (US)

(72) Inventors: Shengbing Jiang, Rochester Hills, MI (US); Zifeng Peng, Rochester Hills, MI (US); Xinyu Du, Oakland Township, MI (US); Yilu Zhang, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 230 days.

(21) Appl. No.: 18/327,572

(22) Filed: Jun. 1, 2023

(65) Prior Publication Data

US 2024/0401970 A1    Dec. 5, 2024

(51) Int. Cl.
| | |
|---|---|
| *G01C 21/00* | (2006.01) |
| *B60W 40/072* | (2012.01) |
| *B60W 60/00* | (2020.01) |
| *G01C 21/32* | (2006.01) |
| *B60W 50/02* | (2012.01) |

(52) U.S. Cl.
CPC ....... *G01C 21/3819* (2020.08); *B60W 40/072* (2013.01); *B60W 60/001* (2020.02); *G01C 21/32* (2013.01); *B60W 2050/0215* (2013.01); *B60W 2420/403* (2013.01); *B60W 2552/30* (2020.02); *B60W 2555/20* (2020.02); *B60W 2556/20* (2020.02); *B60W 2556/40* (2020.02)

(58) Field of Classification Search
CPC .. B60W 30/045; B60W 40/072; B60W 50/00; B60W 60/001; B60W 2050/0215; B60W 2420/403; B60W 2552/30; B60W 2555/20; B60W 2556/40; G01C 21/28; G01C 21/30; G01C 21/319; G01C 21/3819; G01C 21/3822; G01C 21/3848
See application file for complete search history.

(56) References Cited

U.S. PATENT DOCUMENTS

| | | | |
|---|---|---|---|
| 11,782,451 B1 * | 10/2023 | Venkatraman | G05D 1/0221 |
| | | | 701/26 |
| 2019/0291728 A1 * | 9/2019 | Shalev-Shwartz | ............ |
| | | | B60W 30/0956 |
| 2019/0291742 A1 * | 9/2019 | Leach | B60W 50/0097 |

FOREIGN PATENT DOCUMENTS

EP    3470789 A1 *  4/2019  ............ B60W 30/12

* cited by examiner

*Primary Examiner* — Donald J Wallace
*Assistant Examiner* — Alex B Griffin
(74) *Attorney, Agent, or Firm* — CANTOR COLBURN LLP

(57) ABSTRACT

A vehicle includes a system and method of operating the vehicle. The system includes a camera, a map database and a processor. The camera obtains camera data of a location of a road being traversed by the vehicle. The map database provides map data of the location of the road. The processor determines a first curvature of the road at the location from the camera data, determines a second curvature of the road at the location from the map data, identifies a mismatch between the first curvature and the second curvature at the location of the road, generates a case report for one of the map data and the camera data at the location upon occurrence of the mismatch, and adjusts one of the map data and a confidence level in the camera data for the location based on the case report.

20 Claims, 9 Drawing Sheets

SELF ADAPTIVE ENHANCEMENT FOR AUTOMATED DRIVING WITH MAP AND CAMERA ISSUES

INTRODUCTION

The subject disclosure relates to autonomous vehicles and, in particular, to a system and method for correcting map data and/or camera data used in guiding the autonomous vehicles along a section of road.

Automated driving of a vehicle relies on map data and/or camera data to identify a direction of a road and a curvature of the road. When the camera data and the map data do not match each other at a given location, technical personnel are called in to manually identify the causes for the mismatch and propose solutions for improving the data integrity. Such reliance on technical personnel is time consuming. Accordingly, it is desirable to provide a system that determines which of map data and camera data is in error and makes necessary corrections.

SUMMARY

In one exemplary embodiment, a method of operating a vehicle is disclosed. Camera data of a location of a road is obtained, the camera data being used by the vehicle to traverse the location. Map data of the location of the road is obtained, the map data being used by the vehicle to traverse the location. A first curvature of the road is determined at the location from the camera data. A second curvature of the road is determined at the location from the map data. A mismatch is identified between the first curvature and the second curvature at the location of the road. A case report is generated for one of the map data and the camera data at the location upon occurrence of the mismatch. One of the map data and a confidence level in the camera data is adjusted for the location based on the case report.

In addition to one or more of the features described herein, the method further includes determining a rationality of one of the map data and the camera data by determining one of a swing in one of the first curvature and the second curvature and an oscillation in one of the first curvature and the second curvature. The method further includes determining an occurrence of an escalation event when one the first curvature and the second curvature is determined to meet a rationality condition. The method further includes comparing a trajectory of a human-driven vehicle to the trajectory of one of the camera data and the map data at the location. The method further includes generating the case report for each time the vehicle traverses the location. The method further includes generating the case report for multiple vehicles traversing the location at different times. The method further includes excluding a case report for the camera data based on an environmental condition.

In another exemplary embodiment, a system for operating a vehicle is disclosed. The system includes a camera, a map database and a processor. The camera is configured to obtain a camera data of a location of a road being traversed by the vehicle. The map database is configured to provide map data of the location of the road. The processor is configured to determine a first curvature of the road at the location from the camera data, determine a second curvature of the road at the location from the map data, identify a mismatch between the first curvature and the second curvature at the location of the road, generate a case report for one of the map data and the camera data at the location upon occurrence of the mismatch, and adjust one of the map data and a confidence level in the camera data for the location based on the case report.

In addition to one or more of the features described herein, the processor is further configured to determine a rationality of one of the map data and the camera data by determining one of a swing in one of the first curvature and the second curvature and an oscillation in one of the first curvature and the second curvature. The processor is further configured to determine an occurrence of an escalation event when one the first curvature and the second curvature is determined to meet a rationality condition. The processor is further configured to compare a trajectory of a human-driven vehicle to the trajectory of one of the camera data and the map data at the location. The processor is further configured to generate the case report for each time the vehicle traverses the location. The processor is further configured to generate the case report for multiple vehicles traversing the location at different times. The processor is further configured to exclude a case report for the camera data based on an environmental condition.

In yet another exemplary embodiment, a vehicle is disclosed. The vehicle includes a camera, a map database and a processor. The camera is configured to obtain a camera data of a location of a road being traversed by the vehicle. The map database is configured to provide map data of the location of the road. The processor is configured to determine a first curvature of the road at the location from the camera data, determine a second curvature of the road at the location from the map data, identify a mismatch between the first curvature and the second curvature at the location of the road, generate a case report for one of the map data and the camera data at the location upon occurrence of the mismatch, and adjust one of the map data and a confidence level in the camera data for the location based on the case report.

In addition to one or more of the features described herein, the processor is further configured to determine a rationality of one of the map data and the camera data by determining one of a swing in one of the first curvature and the second curvature and an oscillation in one of the first curvature and the second curvature. The processor is further configured to determine an occurrence of an escalation event when one the first curvature and the second curvature is determined to meet a rationality condition. The processor is further configured to compare a trajectory of a human-driven vehicle to the trajectory of one of the camera data and the map data at the location. The processor is further configured to generate the case report for each time the vehicle traverses the location. The processor is further configured to generate the case report for multiple vehicles traversing the location at different times.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
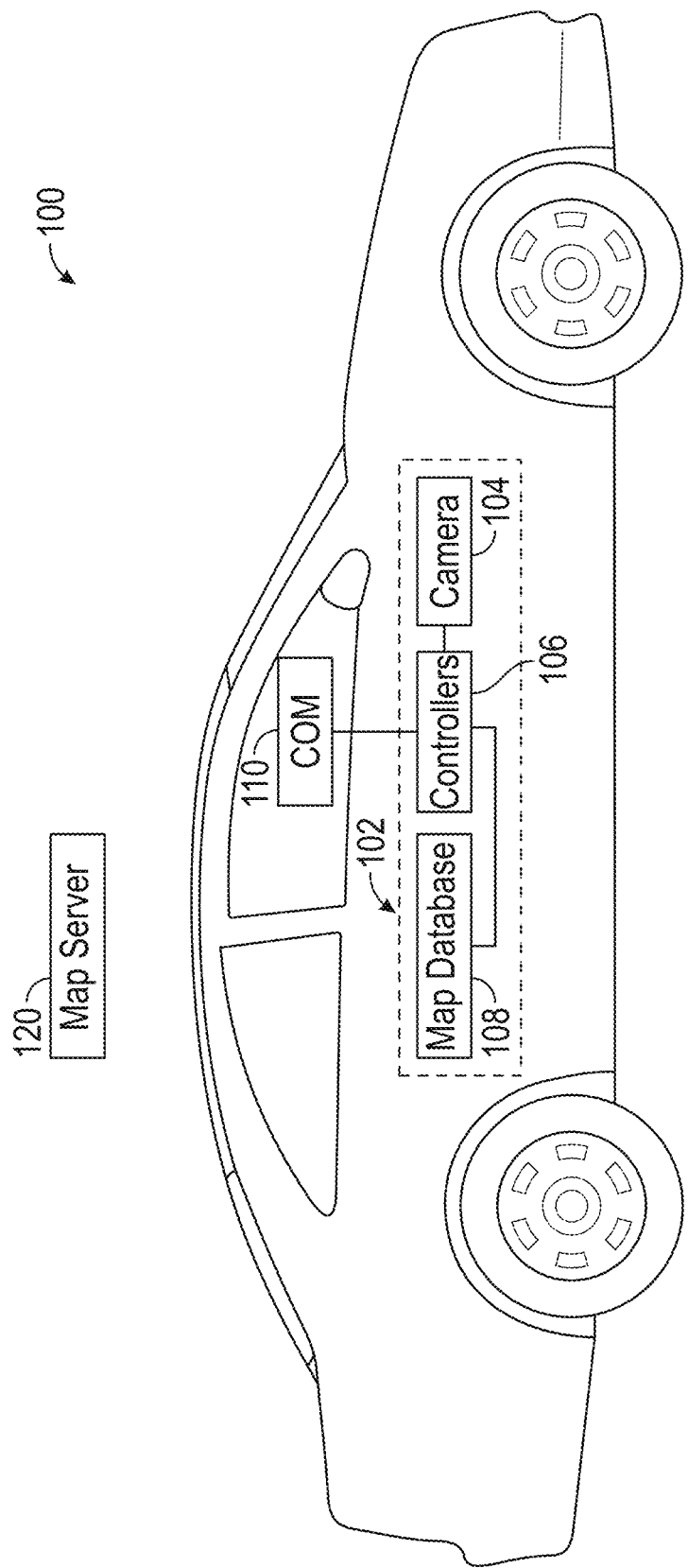
FIG. 1 shows a vehicle that can be operated in an autonomous mode or in a cruise control mode, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100 that can be operated in an autonomous mode or in a cruise control mode. The vehicle 100 includes a driving system 102 that controls motion of the vehicle along a section of road. The driving system 102 can include a camera 104 that obtains information regarding the surroundings of the vehicle 100 including a road on which the vehicle is moving. The driving system 102 also includes a map database 108 that provides a map of the section of road being traversed by the vehicle. The vehicle 100 can obtain both map data and camera data. The vehicle includes a controller 106 that performs various calculations to operate the vehicle using one or more of the map data and the camera data.

The controller 106 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 106 may include a non-transitory computer-readable medium that stores instructions which, when processed by one or more processors of the controller 106, implement a method of determining a difference between map data and camera data and adjust a parameter with respect to either the map data or the camera data for subsequent use. The method includes selecting one of the map data and camera data for creating a trajectory for the vehicle and maneuvering the vehicle along the trajectory.

The vehicle 100 can also include a communication unit 110 that allows the controller 106 to communicate with a map server 120. In an alternative embodiment, map data can be received from the map database 108 and the results of calculations at the controller 106 can be transferred to the map database for implementation.

Figure 2:
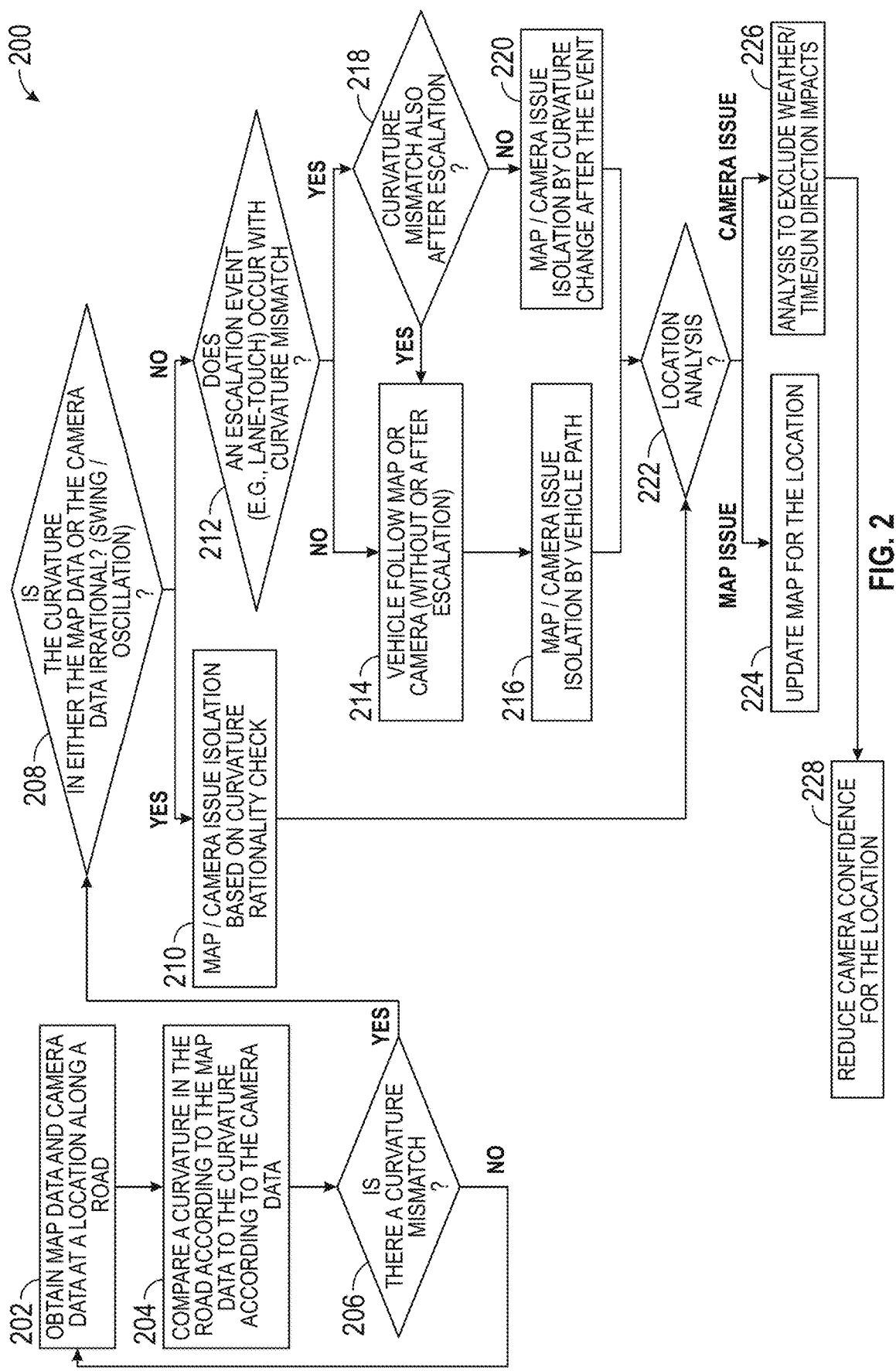
FIG. 2 shows a flow diagram of a method for enhancing automated driving, in an embodiment.

FIG. 2 shows a flow diagram 200 of a method for enhancing automated driving, in an embodiment. In box 202, data is obtained at the vehicle 100 for use in automated driving of the vehicle. The data includes camera data obtained from camera 104 and map data from the map database 108 or the map server 120.

In box 204, a first curvature of the road at a selected location of the road is determined from the map data and a second curvature of the road at the selected location is determined from the camera data.

In box 206, the first curvature and the second curvature are compared to each other to determine if there is a mismatch between them. When the first curvature and the second curvature differ from each other by an amount that is less than a match threshold (i.e., the curvatures match), the method can return to box 202 where new sets of data are obtained from the map database 108 and the camera 104. If the first curvature and the second curvature differ from each other by an amount that is greater than a match threshold (i.e., the curvatures do not match), the method proceeds to box 208.

In box 208, each of the first curvature and the second curvature can be checked for rationality. The rationality of a curvature is determined by quantifying a swing or an oscillation of the curvature of the road into a value and then comparing the value to a threshold. If the value of either the first curvature (i.e., map data) or the second curvature (i.e., camera data) is greater than the threshold, their curvatures are determined to be irrational. If the value is greater than the threshold, the method proceeds to box 210. Otherwise, if the value is less than or equal to the threshold, the curvatures are rational and the method proceeds to box 212.

Referring first to box 210, a case report is generated for an irrational data set. A case report can be generated each time the location is crossed. In box 222, the case reports associated with the location or section of the road are accumulated and counted. From box 222, the method proceeds either to box 224 or to box 226. If there are a large number of case reports for the map data (i.e., greater than a threshold). The method proceeds to box 224. If there are a large number of case reports for the camera data, the method proceeds to box 226.

In box 224, the map is updated with a corrected map for the location or section of road. In box 226, external environmental conditions that may have an impact on data are checked. For example, night-time viewing, rainy weather, etc. can cause the camera data to be poor, even for a camera that is in good condition. Such data is related to the environmental condition. In box 228, a camera confidence level is reduced or adjusted for the section of road based on the environmental conditions.

Referring now to box 212, the camera data is reviewed to determine if an escalation event has occurred at the same time as the curvature mismatch. An illustrative escalation event includes a lane touch event, for example. If an escalation event has not occurred simultaneously with the curvature mismatch, the method proceeds to box 214. Otherwise, the method proceeds to box 218 for location analysis.

In box 214, the trajectory of a human-driven vehicle is compared to the map data and the camera data to determine whether the human-driven vehicle follows or is generally aligned with the map data or the camera data. In box 216, the data set that is not followed by the human-driven vehicle is marked as a potentially incorrect data. The method proceeds from box 216 to box 222 for location analysis.

Returning to box 218, it is determined whether a curvature mismatch occurs after an escalation event. If a mismatch does occur after an escalation event, the method proceeds to box 214. Otherwise, the method proceeds to box 220. In box 220, the number of map data cases and the number of camera data cases are identified. From box 220, the method proceeds to box 222.

Figure 3:
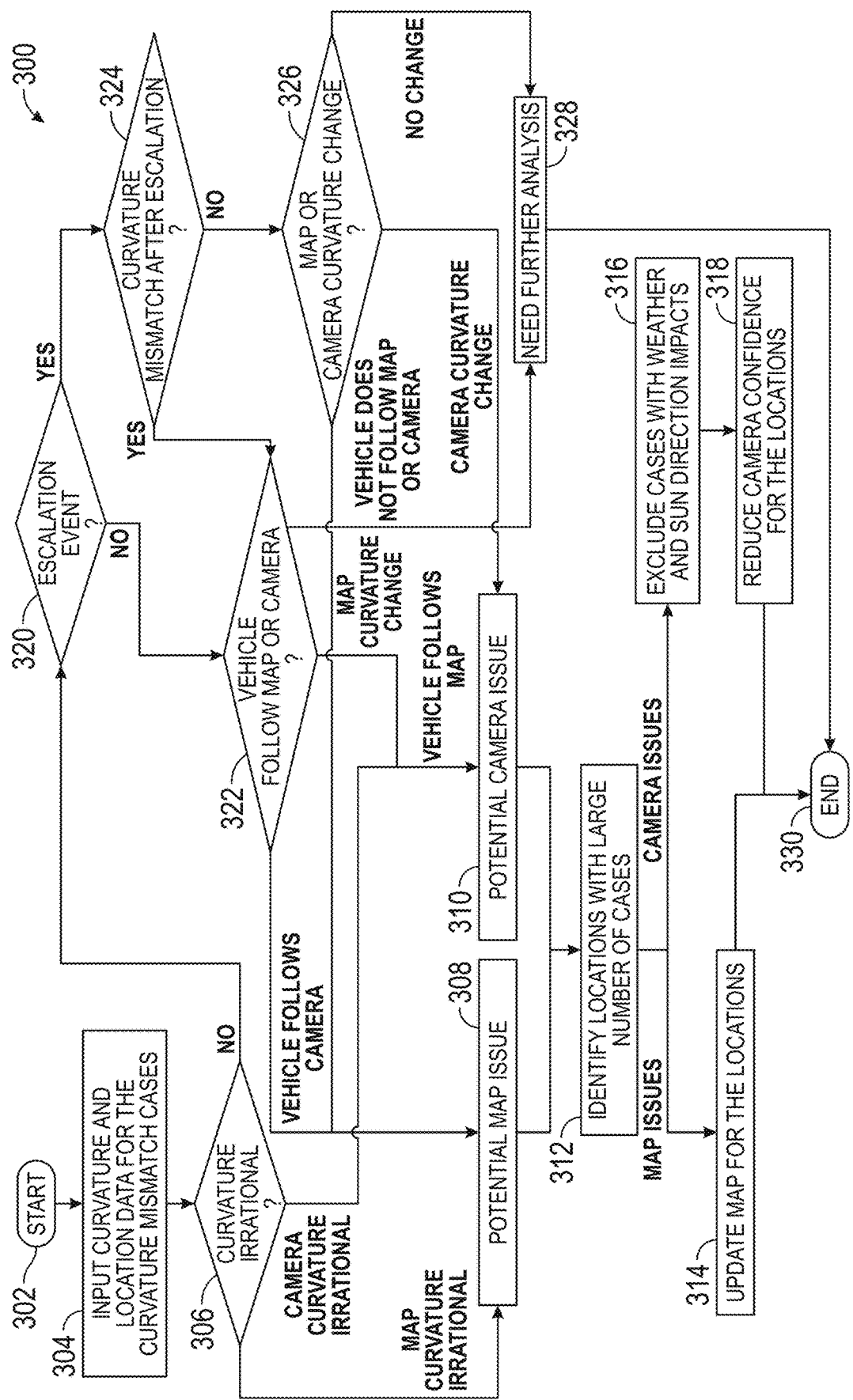
FIG. 3 shows a flowchart of a method for identifying an issue for enhanced use of map data and camera data in enhanced driving.

FIG. 3 shows a flowchart 300 of a method for identifying an issue for enhanced use of the map data and the camera data. The method begins in box 302 where a mismatch has occurred in a first curvature at a location in the road based on the map data at a road location and a second curvature at the location in the road based on the camera data. In box 304, both the first curvature and the second curvature are compared to various rationality threshold to determine whether either of the curvatures are rational or irrational. In box 306, a decision is made based on the results of the calculations performed in box 304. If the first curvature (map data) is irrational, the method proceeds to box 308. If the second curvature (camera data) is irrational, the method proceeds to box 310. If both the first curvature and the second curvature are rational, the method proceeds to box 320.

In box 308 (first curvature is irrational), a case report indicating a potential map issue is generated. In box 310 (second curvature is irrational), a case report indicating a potential camera issue is generated. In box 312, a location is identified with a large number of case reports. From box 312, the method proceeds to box 314 when there is a potential map issue (i.e., a large number of case reports for the map data). In box 314, the map database is updated for the location. From box 314, the method proceeds to box 330, where the method ends.

Referring again to box 312, the method proceeds to box 316 when there is a potential camera issue (i.e., a large number of case reports for the camera data). In box 316, the impact of weather conditions on the camera data is taken into account. In box 318, a confidence level for the camera data is adjusted (or reduced) based on the camera data issues and the impact of weather conditions on the camera data. From box 318, the method proceeds to box 330, where the method ends.

Referring now to box 320, when both the map data and the camera data are determined to be rational, the processor determines whether an escalation event has occurred. If an escalation event has not occurred, the method proceeds to box 322. In box 322, data indicated of a path of a human-driven vehicle is compared with the map data and the camera data to determine whether a human-driven vehicle follows the map data or the camera data. If the path of the human-driven vehicle aligns with the camera data, the method proceeds to box 308. If the path of the human-driven vehicle aligns with the map data, the method proceeds to box 310. Separately, if the path of the human-driven vehicle does not align with either the map data or the camera data, the method proceeds to box 328 in which further analysis is requested.

Returning to box 320, if an escalation event has occurred, the method proceeds to box 324. In box 324, the data is reviewed to determine if there is a curvature mismatch that occurs after the escalation event. If there is a curvature mismatch after escalation, the method proceeds to box 322. If there is no curvature mismatch after the escalation event, the method proceeds to box 326. In box 326, the map data and the camera data are reviewed to determine if a change in curvature has occurred in either the map data or the camera data. If a change in curvature occurs in the map data, the method proceeds to box 308. If a change in curvature occurs in the camera data, the method proceeds to box 310. If a change does not occur in either the camera data or the map data, the method proceeds to box 328. In box 328, further analyzed is requested and/or performed. From box 328, the method proceeds to box 330, where the method ends.

Figure 4:
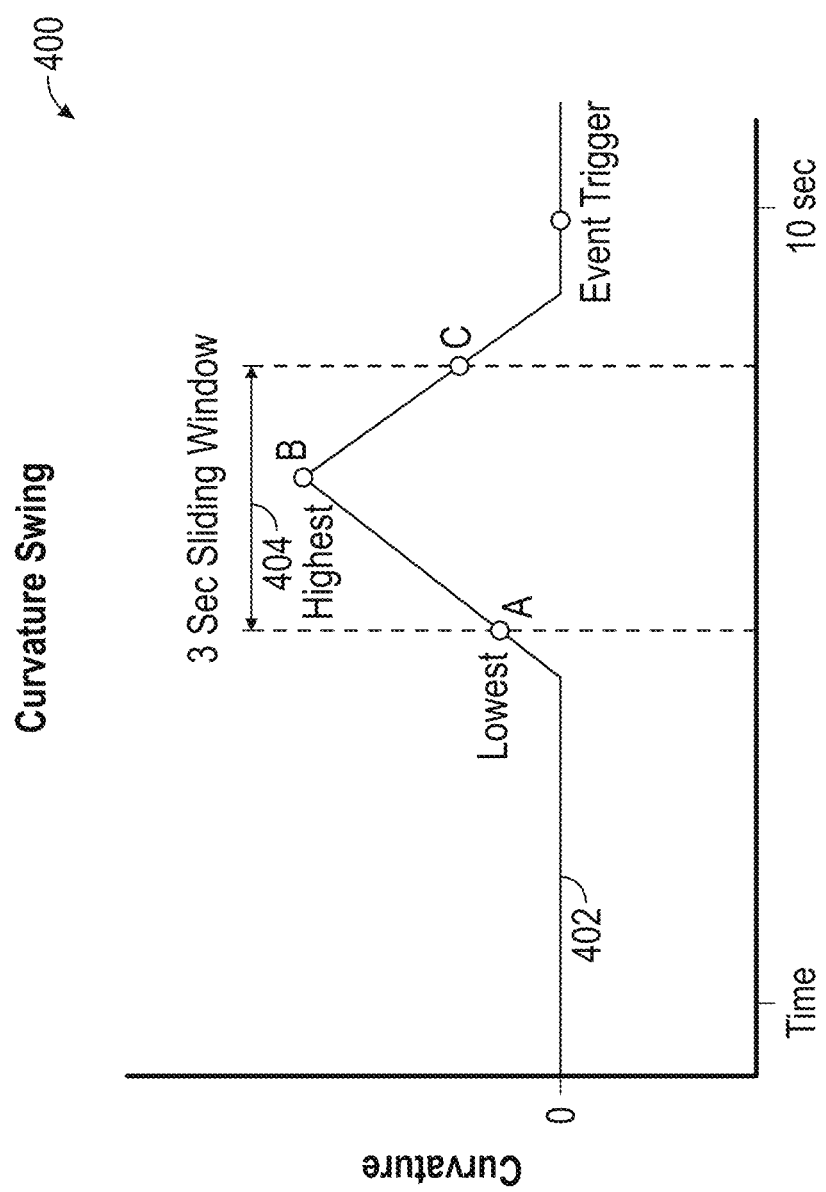
FIG. 4 shows a graph of a timeline of a trajectory of a vehicle following a selected data set, in an embodiment.

FIG. 4 shows a graph 400 of a timeline of a trajectory 402 of a vehicle following a selected data set. Time in seconds(s) is shown along the abscissa and amplitude (A) is shown along the ordinate axis. A section of the trajectory 402 can be isolated using a sliding window 404 and the curvature within the sliding window can be analyzed. In an embodiment, the swing of the curvature can be reviewed for rationality.

To analyze the swing, three curvature amplitudes are determined. A first curvature amplitude ($Curv_A$) is the curvature at a rear of the sliding window. A second curvature amplitude ($Curv_B$) is the curvature that has the highest value of within the sliding window. A third curvature amplitude ($Curv_C$) is the curvature at the front of the sliding window. The rationality of the swing can be determined by comparing the curvatures to various conditions (shown in Eqs. (1)-(4)) based on the amplitudes. The change of curvature between any two curvatures can be compared to a relative threshold, as shown in Eq. (1):

$$|Curv_1 - Curv_2| > \max|Curv| * Th_{rel} \qquad \text{Eq. (1)}$$

where the indices (1,2) can be (A,B) or (B,C), Curv is the data set of all curvature values and $Th_{rel}$ is a relative threshold that can be predetermined. The change of curvature can also be compared to an absolute threshold, as shown in Eqs. (2) and (3):

$$|Curv_A - Curv_B| > Th_{abs} \qquad \text{Eq. (2)}$$

$$|Curv_B - Curv_C| > Th_{abs} \qquad \text{Eq. (3)}$$

Additionally, a product of the changes in curvature are checked for whether it is positive or negative, as shown in Eq. (4):

$$(Curv_A - Curv_B) * (Curv_B - Curv_C) < 0 \qquad \text{Eq. (4)}$$

When all of Eqs. (1)-(4) are satisfied for a data set, the curvature of the data set is considered to be irrational.

Figure 5:
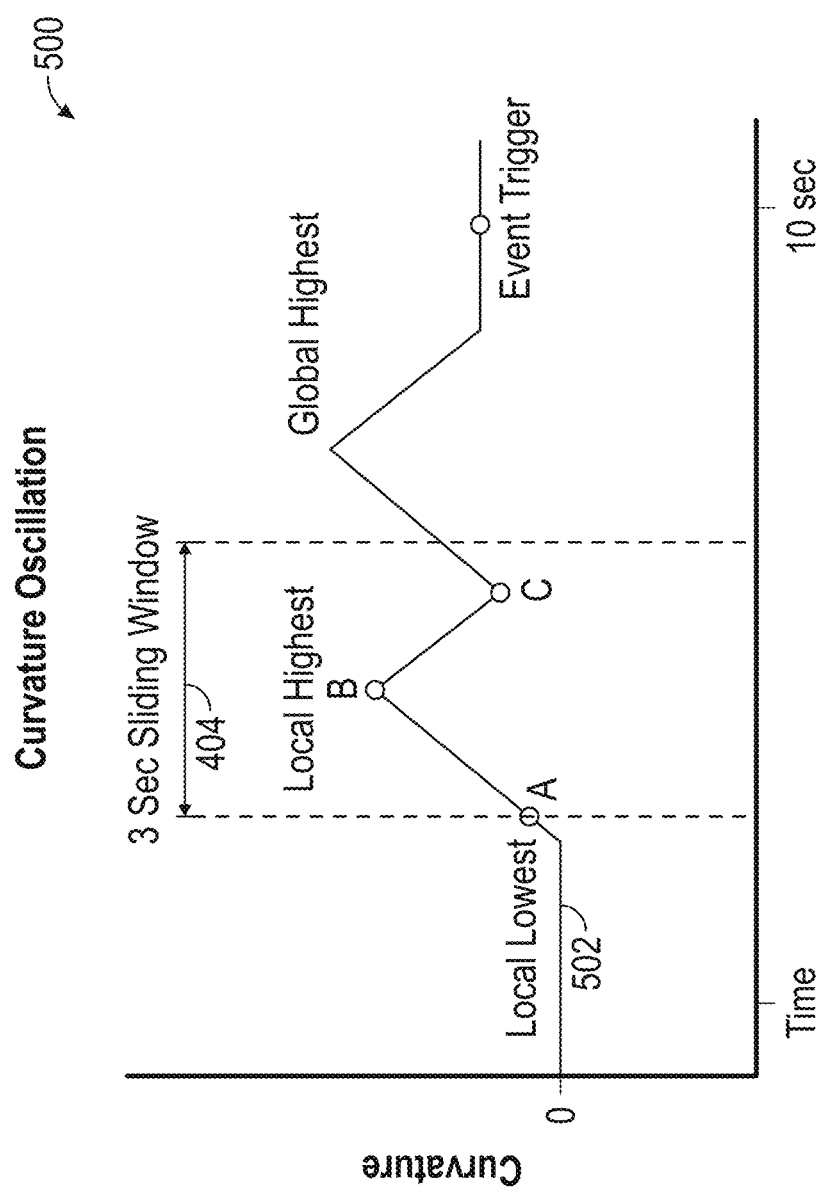
FIG. 5 shows a graph of a timeline of a trajectory of a vehicle following a selected data set, in another embodiment.

FIG. 5 shows a graph 500 of a timeline of a trajectory 502 of a vehicle following a selected data set, in another embodiment. Time in seconds(s) is shown along the abscissa and amplitude (A) is shown along the ordinate axis. A section of the trajectory 502 can be isolated by the sliding window 404. The oscillation of the curvature can be calculated.

To analyze the oscillation, three curvature amplitudes are determined. A first curvature amplitude ($Curv_A$) is the point having the local lowest value of curvature within the sliding window. A second curvature amplitude ($Curv_B$) is the curvature that has the highest value of curvature within the sliding window. A third curvature amplitude ($Curv_C$) is the curvature at an inflection point in the curvature after then second curvature amplitude. The rationality of the oscillation can be determined by comparing the curvatures to various conditions (shown in Eqs. (5)-(8)) based on the amplitudes. The change of curvature between any two curvatures can be compared to a relative threshold, as shown in Eq. (5):

$$|Curv_1 - Curv_2| > \max|Curv| * Th_{rel} \qquad \text{Eq. (5)}$$

The change of curvature can also be compared to an absolute threshold, as shown in Eqs. (6) and (7):

$$|Curv_A - Curv_B| > Th_{abs}/2 \qquad \text{Eq. (6)}$$

$$|Curv_B - Curv_C| > Th_{abs}/2 \qquad \text{Eq. (7)}$$

Additionally, a product of the changes in curvature are checked for whether it is positive or negative, as shown in Eq. (8):

$$(Curv_A - Curv_B) * (Curv_B - Curv_C) < 0 \qquad \text{Eq. (8)}$$

In addition, the trajectory is reviewed to determine whether the same pattern occurs within a 10 second interval.

Figure 6:
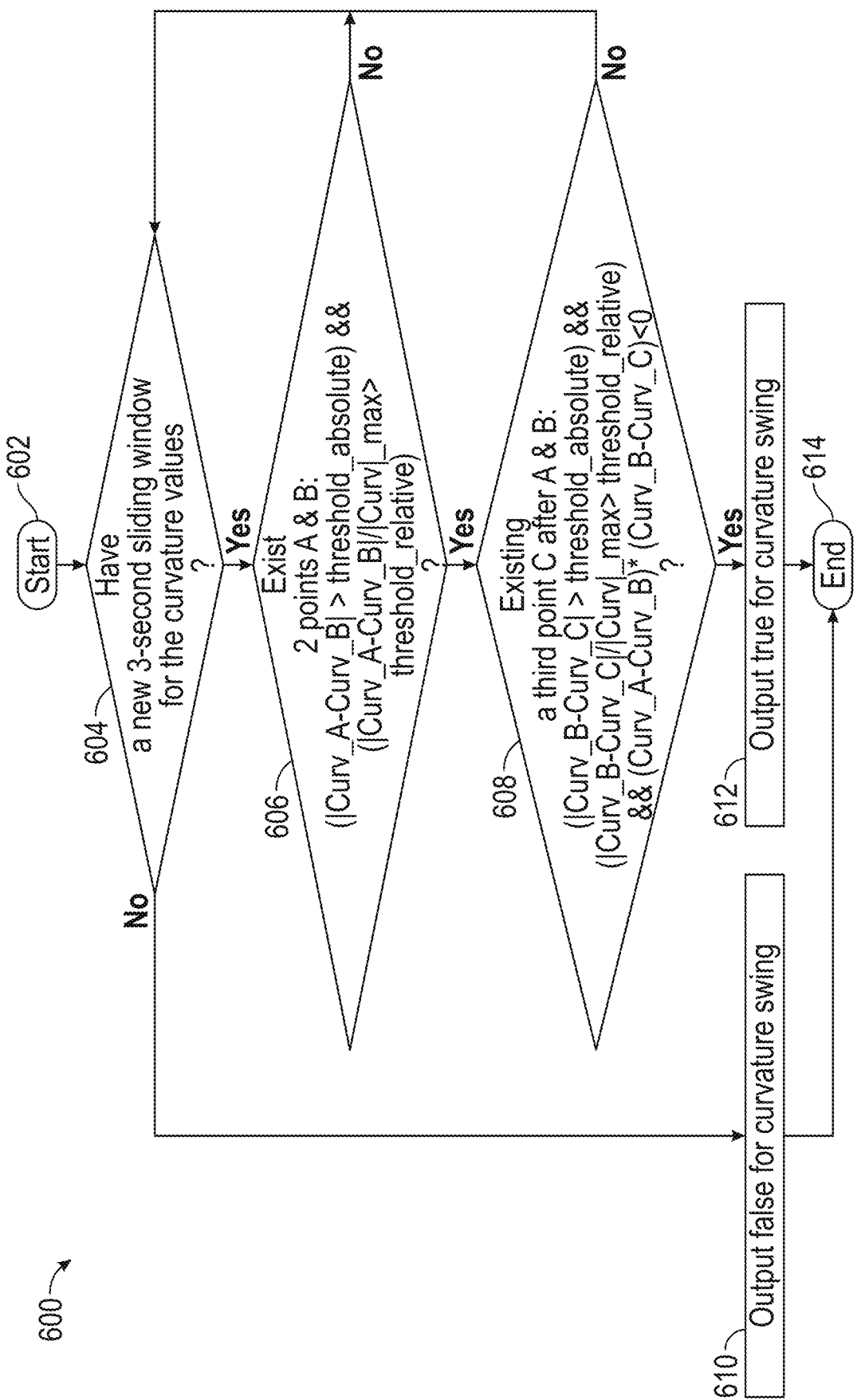
FIG. 6 shows a flowchart of a method for determining a rationality of a curvature swing of a trajectory.

FIG. 6 shows a flowchart 600 of a method for determining a rationality of a curvature swing. The method starts at box 602. In box 604, a sliding window is identified. If a sliding window having a preselected time duration can not be identified, the method proceeds to box 610. In an illustrative embodiment, the preselected time duration is 3 seconds. In box 610, an output is generated that indicates that there is no curvature swing. The method then proceeds to box 614 in which the method ends.

Returning to box 604, if a sliding window is identified, curvature points can be located and tested as the method proceeds to box 606. Otherwise, the method returns to box 604. In box 606, the first curvature (CurvA) and second curvature (Curv$_B$) are identified. If Eq. (2) and Eq. (1) are satisfied for the first curvature and the second curvature, the method proceeds to box 608. Otherwise, the method returns to box 604. In box 608, the third curvature (CurvC) is identified. If Eq. (3), Eq. (1) are satisfied for the second curvature and the third curvature and Eq. (4) is satisfied, the method proceeds to box 612. Otherwise, the method returns to box 604. In box 612, an output is generated that indicated that there is a curvature swing.

Figure 7:
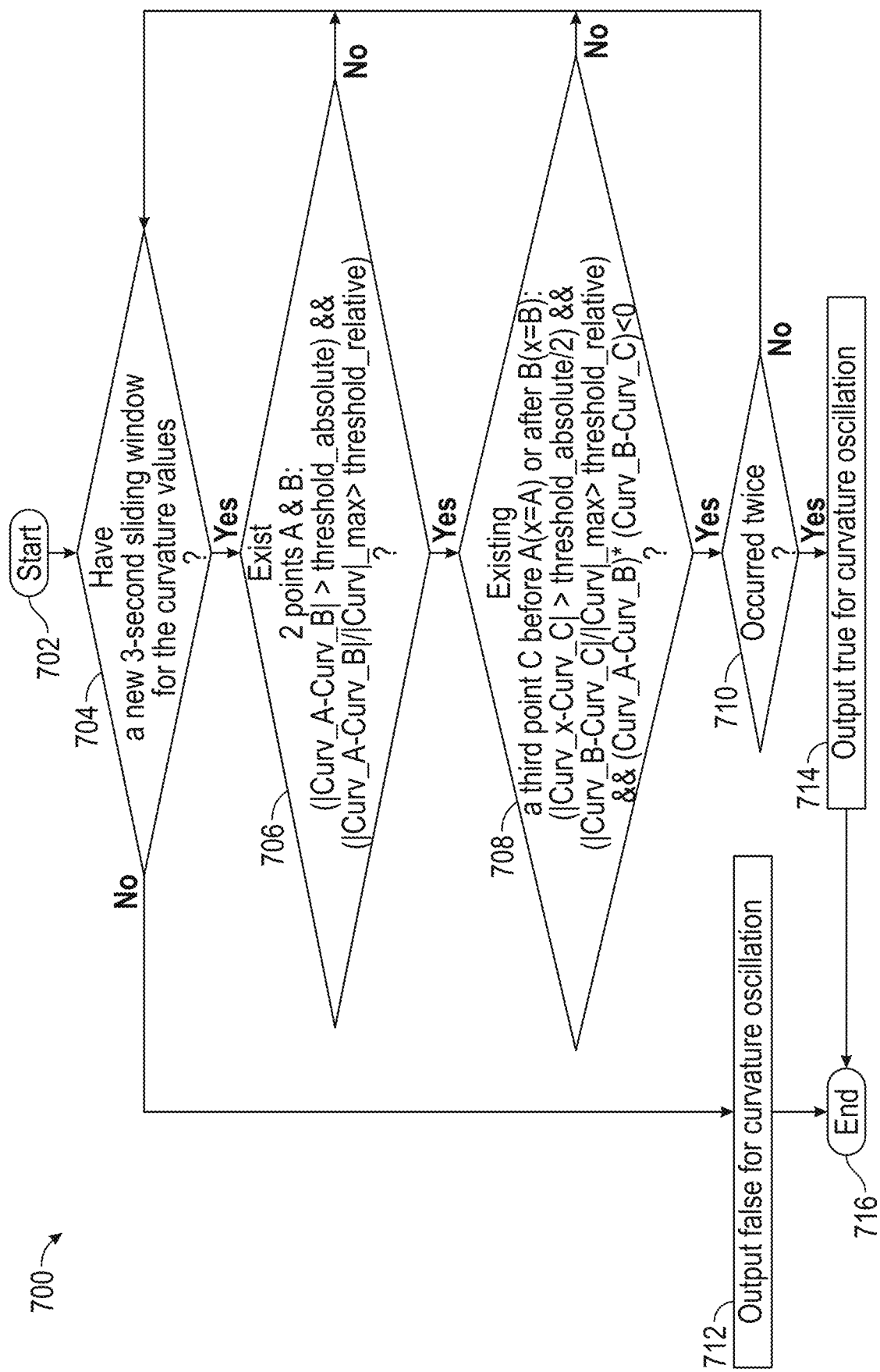
FIG. 7 shows a flowchart of a method of determining a rationality of a curvature oscillation.

FIG. 7 shows a flowchart 700 of a method of determining a rationality of a curvature oscillation. The method starts at box 702. In box 704, a sliding window is identified. If a sliding window having a preselected time duration cannot be identified, the method proceeds to box 712. In box 712, an output is generated that indicates that there is no curvature oscillation. The method then proceeds to box 716 in which the method ends.

Returning to box 704, if a sliding window is identified, curvature points can be located and tested as the method proceeds to box 706. In box 706, the first curvature (Curv$_A$) and second curvature (Curv$_B$) are identified. If Eq. (6) and Eq. (7) are satisfied for the first curvature and the second curvature, the method proceeds to box 708. Otherwise, the method returns to box 704. In box 708, the third curvature (Curv$_C$) is identified. If Eq. (7), Eq. (5) are satisfied for the second curvature and the third curvature and Eq. (8) is satisfied, the method proceeds to box 710. Otherwise, the method returns to box 704. In 710, a check is made to determine if these conditions are satisfied for another section of the timeline within a 10 second window. If the conditions are satisfied within the 10 second window, the method process to box 714. Otherwise, the method returns to box 704. In box 714, an output is generated that indicated that there is a curvature oscillation.

Figure 8:
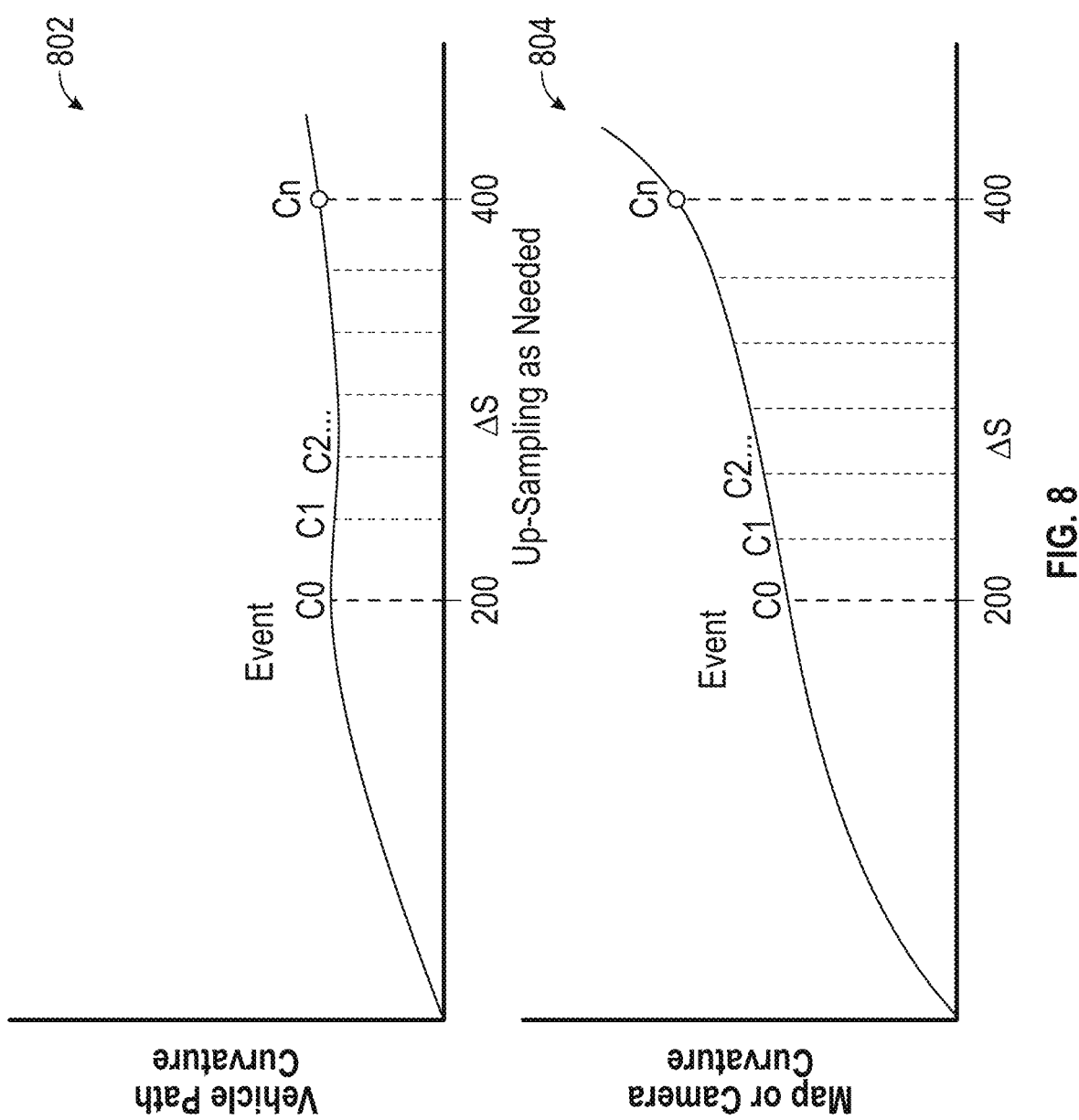
FIG. 8 shows a first curvature for a trajectory of a human-driven vehicle and a second curvature for a trajectory based on a data set.

FIG. 8 shows a first curvature 802 for a trajectory of a human-driven vehicle and a second curvature 804 for a trajectory based on a data set (either from map data or camera data). Time (t) is shown along the abscissa and curvature (C) is shown along the ordinate axis. These curvatures can be compared to determine if the vehicle has followed the data set. Referring to the first curvature 802, curvature values CV0, CV1, . . . , CVn are calculated at intervals over a sampling period ΔS. Similar curvature values (second curvature 804) include curvature values CM0, CM1, . . . , CMn for map data and/or CC0, CC1, . . . , CCn for camera data, which are calculated at the same intervals as for the human driven vehicle. An area sum for the vehicle data is shown in Eq. (9):

$$SV = (CV0 + CV1 + \ldots + CVn) * \Delta S \qquad \text{Eq. (9)}$$

Similarly, an area sum for the map data is shown in Eq. (10):

$$SM = (CM0 + CM1 + \ldots + CMn) * \Delta S \qquad \text{Eq. (10)}$$

and an area sum for the camera data is shown in Eq. (11):

$$SC = (CC0 + CC1 + \ldots + CCn) * \Delta S \qquad \text{Eq. (11)}$$

A difference between the vehicle curvature and the map data curvature is calculated by:

$$D1 = SV - SM \qquad \text{Eq. (12)}$$

and a difference between the vehicle curvature and the camera data curvature is calculated by:

$$D2 = SV - SC \qquad \text{Eq. (13)}$$

If:

$$D2 - D1 \geq Th_{Curv} \qquad \text{Eq. (14)}$$

where Th$_{Curv}$ is a calibratable threshold that can be determined at design time, then the vehicle is following the map data. Otherwise, if:

$$D1 - D2 \geq Th_{Curv} \qquad \text{Eq. (15)}$$

then the vehicle is following the camera data.

Figure 9:
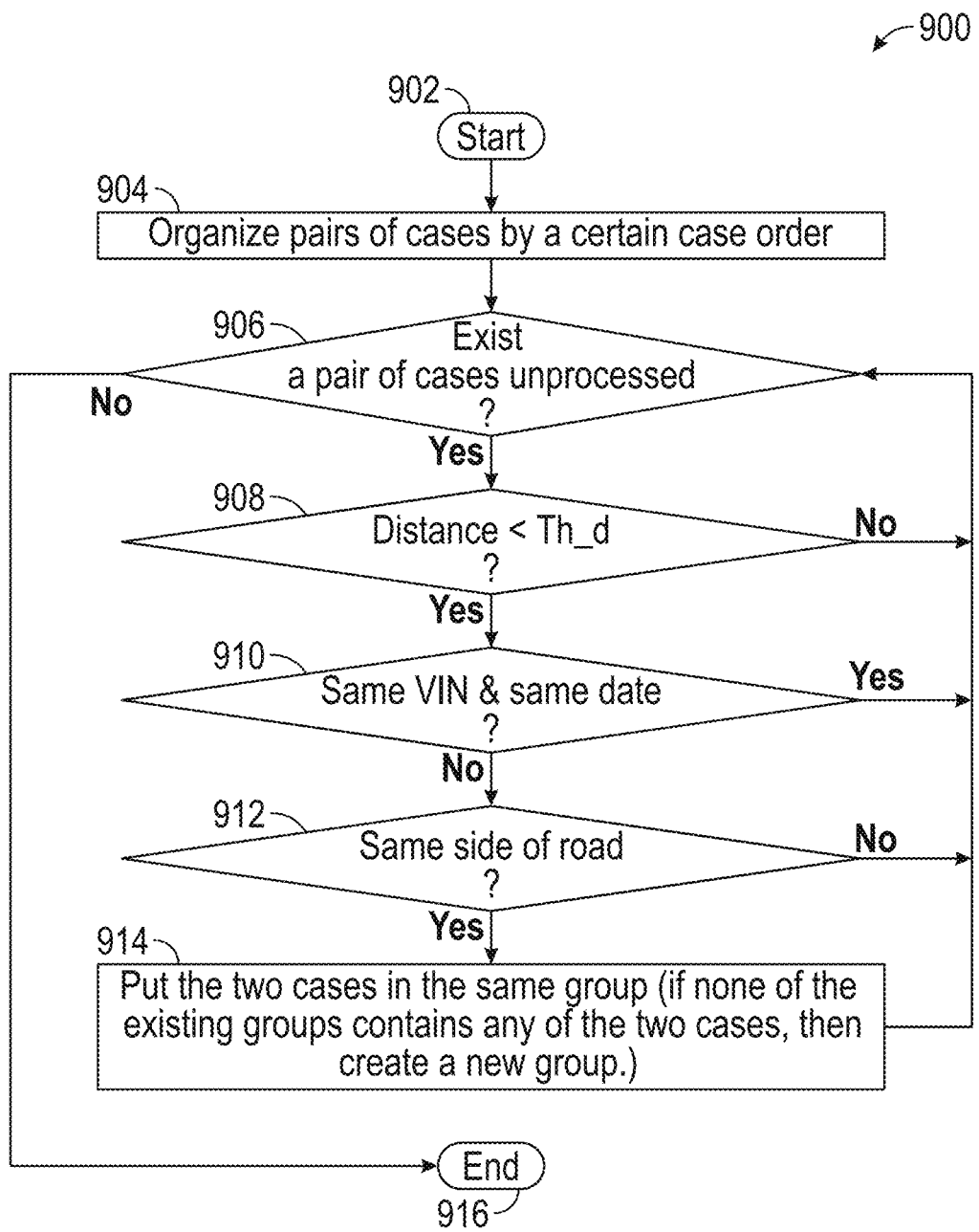
FIG. 9 shows a flowchart illustrating a method of location analysis.

FIG. 9 shows a flowchart 900 illustrating a method of location analysis (as performed in box 222 of FIG. 2 or in box 312 of FIG. 3). The method begins at box 902. In box 904, the cases are organized to be placed in a case order. In box 906, the cases are reviewed to see if there exists a pair of cases that is unprocessed. If there are not unprocessed cases, the method proceeds to box 916 where the method ends.

If there are unprocessed cases, the method proceeds to box 908. In box 908, the distance is compared to a distance threshold. If the distance is less than the distance threshold, the method returns to box 906. Otherwise, the method proceeds to box 910. Distance can be determined using the following:

$$\text{distance} = 2r\sin^{-1}\left(\sqrt{\sin^2\left(\frac{\varphi_2 - \varphi_1}{2}\right) + \cos\varphi_1 \cdot \cos\varphi_2 \cdot \sin^2\left(\frac{\lambda_2 - \lambda_1}{2}\right)}\right) \quad \text{Eq. (16)}$$

Where $\varphi_1$ and $\varphi_2$ are the latitude of point 1 and the latitude of point 2, respectively, and $\lambda 1$ and $\lambda 1$ are the longitude of point 1 and the longitude of point 2, respectively.

In box 910, the cases are reviewed to see if they are associated with a same VIN (vehicle identification number) and a same date. If they are associated, the method returns to box 906. Otherwise, the method proceeds to box 912. In box 912, the cases are compared to see if they are from the same side of the road. If they are not from the same side of the road, the method returns to box 906. Otherwise, the method proceeds to box 914. In box 914, the two cases are placed in the same group. If none of the existing groups can accommodate the two cases, then a new group is created.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:
   obtaining a camera data of a section of a road, the camera data being used by the vehicle to traverse the section;
   obtaining map data of the section of the road, the map data being used by the vehicle to traverse the section;
   comparing the camera data and the map data to determine a mismatch;
   determining an irrationality of one of the map data and the camera data when the mismatch is determined, wherein determining the irrationality includes isolating the section of the road within a time window, determining a first curvature value of the section at a first time within the time window, determining a second curvature value of the section at a second time within the time window, and comparing a difference between the first curvature value and the second curvature value to a threshold value;
   generating a case report for at least one of the map data and the camera data which is determined to be irrational for the section of the road;
   adjusting one of the map data and a confidence level in the camera data for the section of the road based on the case report;
   creating a trajectory based on one of the map data and the camera data; and
   maneuvering the vehicle along the trajectory.

2. The method of claim 1, further comprising determining the irrationality of one of the map data and the camera data by selecting the first curvature value at a rear of the time window, the second curvature value as a highest value of curvature within the time window and a third curvature value at a front of the time window, determining a first difference between the first curvature value and the second curvature value to be greater than the threshold, determining a second difference between the second curvature value and the third curvature value to be greater than the threshold, and determining a product of the first difference and the second difference to be negative.

3. The method of claim 1, further comprising determining an occurrence of an escalation event when one the first curvature and the second curvature is determined to meet a rationality condition.

4. The method of claim 1, further comprising comparing a trajectory of a human-driven vehicle to the trajectory of one of the camera data and the map data at the location.

5. The method of claim 1, further comprising generating the case report for each time the vehicle traverses the location.

6. The method of claim 1, further comprising excluding a case report for the camera data based on an environmental condition.

7. The method of claim 1, further comprising determining the irrationality of one of the map data and the camera data by selecting the first curvature value to be a minimum curvature within the time window, the second curvature value to be a highest value of curvature within the time window and a third curvature value to be a curvature at an inflection point after the second curvature value within the time window, determining a first difference between the first curvature value and the second curvature value to be greater than the threshold, determining a second difference between the second curvature value and the third curvature value to be greater than the threshold, and determining a product of the first difference and the second difference to be negative.

8. A system for operating a vehicle, comprising:
a camera configured to obtain a camera data of a section of a road being traversed by the vehicle;
a map database configured to provide map data of the section of the road being traversed by the vehicle;
a processor configured to:
compare the camera data and the map data to determine a mismatch;
determine an irrationality of one of the map data and the camera data when the mismatch is determined, wherein determining the irrationality includes isolating the section of the road within a time window, determining a first curvature value of the section at a first time within the time window, determining a second curvature value of the section at a second time within the time window, and comparing a difference between the first curvature value and the second curvature value to a threshold value;
generate a case report for at least one of the map data and the camera data which is determined to be irrational for the section of the road;
adjust one of the map data and a confidence level in the camera data for the section of the road based on the case report;
create a trajectory based on one of the map data and the camera data; and
maneuver the vehicle along the trajectory.

9. The system of claim 8, wherein the processor is further configured to determine the irrationality of one of the map data and the camera data by selecting the first curvature value at a rear of the time window, the second curvature value as a highest value of curvature within the time window and a third curvature value at a front of the time window, determining a first difference between the first curvature value and the second curvature value to be greater than the threshold, determining a second difference between the second curvature value and the third curvature value to be greater than the threshold, and determining a product of the first difference and the second difference to be negative.

10. The system of claim 8, wherein the processor is further configured to determine an occurrence of an escalation event when one the first curvature and the second curvature is determined to meet a rationality condition.

11. The system of claim 8, wherein the processor is further configured to compare a trajectory of a human-driven vehicle to the trajectory of one of the camera data and the map data at the location.

12. The system of claim 8, wherein the processor is further configured to generate the case report for each time the vehicle traverses the location.

13. The system of claim 8, wherein the processor is further configured to exclude a case report for the camera data based on an environmental condition.

14. The system of claim 8, wherein the processor is further configured to determine the irrationality of one of the map data and the camera data by selecting the first curvature value to be a minimum curvature within the time window, the second curvature value to be a highest value of curvature within the time window and a third curvature value to be a curvature at an inflection point after the second curvature value within the time window, determining a first difference between the first curvature value and the second curvature value to be greater than the threshold, determining a second difference between the second curvature value and the third curvature value to be greater than the threshold, and determining a product of the first difference and the second difference to be negative.

15. A vehicle, comprising:
a camera configured to obtain a camera data of a section of a road being traversed by the vehicle;
a map database configured to provide map data of the section of the road being traversed by the vehicle;
a processor configured to:
compare the camera data and the map data to determine a mismatch;
determine an irrationality of one of the map data and the camera data when the mismatch is determined, wherein determining the irrationality includes isolating the section of the road within a time window, determining a first curvature value of the section at a first time within the time window, determining a second curvature value of the section at a second time within the time window, and comparing a difference between the first curvature value and the second curvature value to a threshold value;
generate a case report for at least one of the map data and the camera data which is determined to be irrational for the section of the road;
adjust one of the map data and a confidence level in the camera data for the section of the road based on the case report;
create a trajectory based on one of the map data and the camera data; and
maneuver the vehicle along the trajectory.

16. The vehicle of claim 15, wherein the processor is further configured to determine the irrationality of one of the map data and the camera data by selecting the first curvature value at a rear of the time window, the second curvature value as a highest value of curvature within the time window and a third curvature value at a front of the time window, determining a first difference between the first curvature value and the second curvature value to be greater than the threshold, determining a second difference between the second curvature value and the third curvature value to be greater than the threshold, and determining a product of the first difference and the second difference to be negative.

17. The vehicle of claim 15, wherein the processor is further configured to determine an occurrence of an escalation event when one the first curvature and the second curvature is determined to meet a rationality condition.

18. The vehicle of claim 15, wherein the processor is further configured to compare a trajectory of a human-driven vehicle to the trajectory of one of the camera data and the map data at the location.

19. The vehicle of claim 15, wherein the processor is further configured to generate the case report for each time the vehicle traverses the location.

20. The vehicle of claim 15, wherein the processor is further configured to determine the irrationality of one of the map data and the camera data by selecting the first curvature value to be a minimum curvature within the time window, the second curvature value to be a highest value of curvature within the time window and a third curvature value to be a curvature at an inflection point after the second curvature value within the time window, determining a first difference between the first curvature value and the second curvature value to be greater than the threshold, determining a second difference between the second curvature value and the third curvature value to be greater than the threshold, and determining a product of the first difference and the second difference to be negative.

* * * * *